Aug. 6, 1940.   F. H. GULLIKSEN   2,210,715
ELECTRONIC REGULATOR
Filed April 7, 1937

WITNESSES:
C. J. Weller.
F. E. Hardy

INVENTOR
Finn H. Gulliksen.
BY Ezra W. Savage
ATTORNEY

Patented Aug. 6, 1940

2,210,715

UNITED STATES PATENT OFFICE 2,210,715

ELECTRONIC REGULATOR

Finn H. Gulliksen, Wilkinsburg, Pa., assignor to Westinghouse Electric & Manufacturing Company, East Pittsburgh, Pa., a corporation of Pennsylvania Application April 7, 1937, Serial No. 135,483

13 Claims. (Cl. 171—119)

My invention relates to electronic regulators, and is particularly adapted for use in controlling an electrical quantity, such as voltage, of an alternating current circuit.

One object of my invention is to provide an electronic regulator that is reliable and accurate in operation and that is rapid in response to changes in the regulated quantity.

Another object of the invention is the provision of an electronic regulator having a detector circuit that is quick in its initial response to variations in the regulated quantity from the desired value and that is thereafter recalibrated to insure an accurate final adjustment.

A further object of my invention is the provision of an anti-hunting circuit that is promptly responsive to variations in the regulated quantity.

Figure 1:
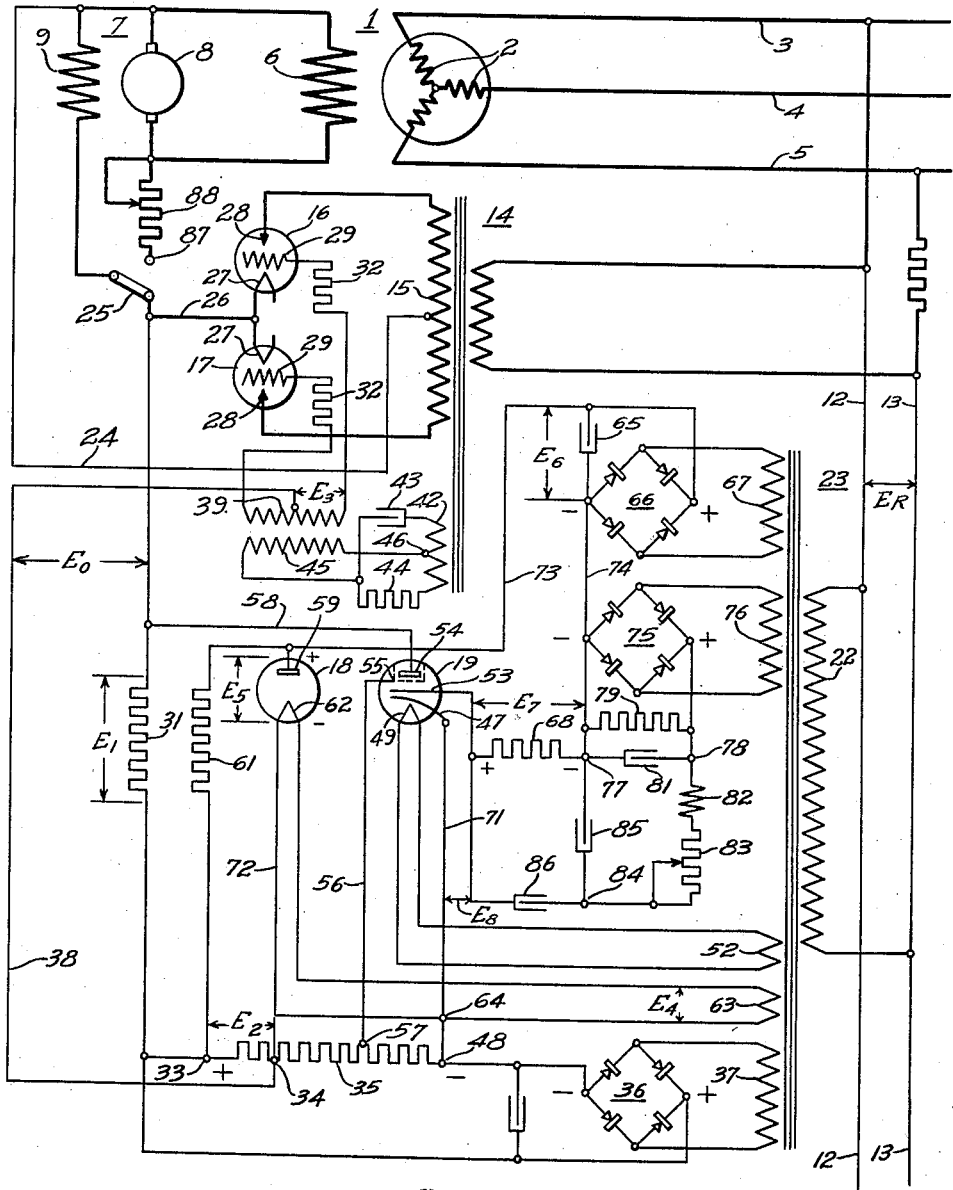
Figure 2:
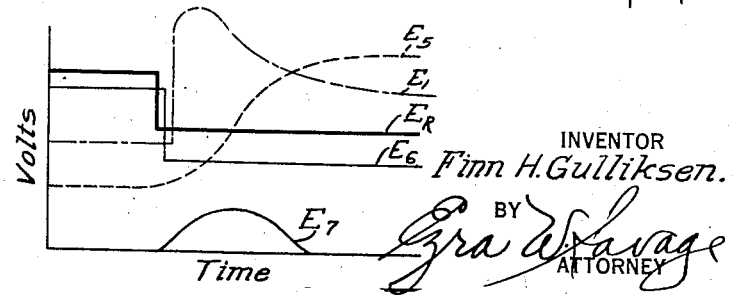

Other objects and advantages of my invention will appear from the following description of one preferred embodiment thereof, reference being had to the accompanying drawing, in which Figure 1 is a diagrammatic view of apparatus and circuits illustrating a preferred embodiment of the invention, and Fig. 2 illustrates curves showing certain relationships between component voltages of the system.

Referring to the drawing, a machine 1, such as an electric generator, is provided with an armature winding 2 for supplying alternating current energy to a circuit represented by conductors 3, 4, 5 and with a field winding 6 supplied with energy from an exciter generator 7 having an armature winding 8 and a field winding 9. The field winding 9 is supplied with unidirectional current from an alternating current source, such as conductors 3 and 5 through conductors 12 and 13, and a transformer 14 as supplied by the tube rectifiers 16 and 17.

The current output of the rectifiers 16 and 17 is controlled by a detector tube 18 and an amplifying or control tube 19 in accordance with the voltage between conductors 3 and 5 are supplied to the primary winding 22 of a transformer 23 through conductors 12 and 13. The energizing winding for the exciter field 9 extends from the central point of the transformer secondary winding 15, by conductor 24 through the winding 9, switch 25, conductor 26, and cathodes 27 of tubes 16 and 17 respectively, and the anodes 28 thereof, to the opposite terminals of the winding 15, the tubes 16 and 17 providing full wave rectification of the current supplied by the transformer 14 in a well known manner. A control potential $E_0$ that is determined by tubes 18 and 19 is supplied to the grids 29 of tubes 16 and 17 to govern the current output through these tubes to the field winding 9. The voltage $E_0$ is made up of two components $E_1$ and $E_2$, $E_1$ being the voltage drop across a resistor 31, and $E_2$ being the voltage drop between a terminal 33 and an intermediate point 34 of a resistor 35 that is supplied with uni-directional current through a full wave rectifier 36 from a transformer secondary winding 37 that is responsive to variations in the voltage between the power circuit conductors 3 and 5. The grid circuit of tubes 16 and 17 extends from the cathodes 27 through conductor 26, the resistor 31, the portion of the resistor 35 that is between points 33 and 34, conductor 38, and alternate halves of the secondary winding 39 of a phase shifting transformer to the respective grids 29 of the tubes 16 and 17. An alternating current wave of voltage $E_3$ is introduced into the control circuit by the transformer winding 39 that is coupled to the primary winding 45. This voltage is displaced 90 electrical degrees from the wave of the anode voltage of the tubes 16 and 17 in a well known manner by a network connected to the secondary winding 42 of the transformer 14, the opposite terminals of which are connected respectively to a condenser 43 and a resistor 44 that are connected in parallel and to one end of the primary winding 45, the other end of the transformer primary winding 45 being connected to the mid-point 46 of the winding 42.

The primary control of the grid circuit of the rectifier tubes 16 and 17 is the amplifying or control tube 19 having a cathode 47 that is connected to the negative terminal 48 of the resistor 35, a heating element 49 that is supplied with current from the winding 52 of the transformer 23, a control grid 53, an anode 54, and an anode grid 55 that is connected by conductor 56 to an intermediate point 57 on the resistor 35. The anode 54 is connected by conductor 58 through the resistor 31 to the positive terminal of the resistor 35.

The tube 18 is a two-element tube having an anode 59 that is connected through a resistor 61 to the positive terminal 33 of the resistor 35 and a filament cathode 62 that is connected to be heated from a transformer winding 63 in accordance with the voltage $E_4$ that varies with the regulated voltage $E_R$ between conductors 12 and 13. The cathode 62 is also connected through a junction point 64 with the cathode 47 of the tube 19 and to the negative terminal 48 of the resistor 35. The voltage between the cathode 47 and the control grid 53 of the tube 19 is composed of three elements $E_5$, $E_6$ and $E_7$, the voltage $E_5$ being the voltage across the tube 18, the voltage $E_6$ being a unidirectional voltage impressed upon a condenser 65 through a full-wave rectifier 66 supplied with alternating voltage from a transformer winding 67 that varies in accordance with the regulated voltage $E_R$, and the voltage $E_7$ being that developed in an anti-hunting resistor 68. The circuit from the cathode 47 including these voltage components is traced through conductor 71, junction point 64, conductor 72, through tube 18, conductor 73, condenser 65, conductor 74 and resistor 68 to the control grid 53.

The voltage across the anti-hunting resistor 68 is determined by an anti-hunting network to the terminals 77 and 78 of which a unidirectional voltage is supplied through a full-wave rectifier 75 from the transformer winding 76 that varies in accordance with the regulated voltage $E_R$. A resistor 79 and condenser 81 are connected in parallel between the terminals 77 and 78 of the network to form a filter circuit in a well known manner. The circuit through the network between the terminals 77 and 78 extends through a reactor 82, resistor 83, to a junction point 84, thence through two branch circuits, one of which includes a condenser 85, and the other of which includes a condenser 86 and the resistor 68 in series, to the terminal 77. When the regulated quantity $E_R$ is at any constant value, a constant charge exists on the condenser 85 determined by the voltage between terminals 77 and 78, the charge being constant so that no current flows through the anti-hunting resistor 68 and the potential drop thereacross is zero.

When the generator is started, the switch 26 in the exciter generator field winding circuit may be moved to engage the contact 87 to temporarily energize the exciter field winding from the armature winding 8 through a resistor 88 until the machine has built up a substantial voltage, after which the switch member 26 is moved to its illustrated position. In this position, field current flows from the transformer winding 15 through the tubes 16 and 17 which rectify alternate half cycle waves as controlled by the potential of the grids 29. Assuming that the regulated voltage $E_R$ is constant at its desired value, the unidirectional voltage from the rectifier 36 that is impressed upon the resistor 35 will be constant and the voltage component $E_2$ will be constant. The voltage $E_4$ determining the heating of the detector tube cathode 62 is also constant so that the current flow through the tube and the voltage drop $E_5$ thereacross is constant. Likewise, the voltage component $E_6$ that is determined by the voltage $E_R$ through rectifier 66 is constant and the voltage component $E_7$ is zero, as above explained, thus permitting a constant current to flow through the control tube 19 causing a constant voltage drop $E_1$ which combined with a constant component $E_2$ supplies a constant output control voltage $E_0$ for controlling the rectifier tubes 16 and 17.

If, for example, the voltage $E_R$ now drops, which might be caused by a sudden increase in load on the generator 1, the voltage component $E_6$ correspondingly drops. As above noted, the voltage $E_5$ between the cathode 47 and control grid 53 of the tube 19 is made up of three components $E_5$, $E_6$ and $E_7$. The component $E_7$ is zero at the initiation of a change in the voltage $E_R$ and the component $E_5$ is substantially constant for a short time interval thereafter owing to the fact that an appreciable time is necessary for a change in the heating of the cathode 62 after a change in the voltage $E_4$ as indicated by the curve $E_5$ in Fig. 2. Therefore the initial change in the regulator voltage $E_R$, which effects a correspondingly sudden decrease in the voltage component $E_6$ causes the potential of the control grid 53 to become immediately more positive, permitting a greater flow of current through the tube 19 from the positive terminal 33 of the resistor 35 through conductor 31, conductor 58, anode and cathode 54 and 47, and conductor 71 to the negative terminal 48, causing a sudden increase in the voltage $E_1$. This change in the voltage component $E_1$ increases the output voltage $E_0$ of the detector circuit, making the voltage of the rectifier tube grids 29 more positive so that the tubes 16 and 17 will pass more current through the field winding 9 of the exciter generator and increase the excitation of the generator 1 and the voltage between conductors 3 and 5.

At the same time that the voltage component $E_6$ is reduced in response to a reduction in the regulated voltage $E_R$, a wave of stabilizing voltage component $E_7$ (see Fig. 2) is developed across the resistor 68 in a direction to make the grid 53 still more positive for a short duration of time so that the increase in the voltage $E_3$, which is the sum of the voltage components $E_5$, $E_6$ and $E_7$ is increased, thus making the grid more positive to increase the current flow therethrough and cause the voltage component $E_1$ to vary as shown in Fig. 2, to increase the current flow through the tubes 16 and 17 and the exciter field winding.

The curve $E_1$ in Fig. 2 shows the general nature of the voltage change across resistor 31 during the initial part of the regulating action. It will be noted that the voltage $E_2$ makes a rapid change influenced in part by the stabilizing voltage wave $E_7$ which gives a temporary influence to the shape of the curve.

The explanation of the voltage wave $E_7$ will be readily understood in that as the potential $E_R$ is reduced the unidirectional potential across terminals 77 and 78 from the full-wave rectifier 75 is correspondingly reduced, thus reducing the potential across the terminals of the condenser 85. This causes a circuit to flow from the condenser 85 through the condenser 86 and resistor 68 to the terminals 77 and 78, thus making the left-hand or grid end of the resistor 68 more positive than the terminal 77 so long as this discharging current flows from the condenser 85.

After a short time interval during which the corrective action occasioned by the change in the value of the voltage component $E_1$ is under way, the decrease in the heating of the cathode 62 in response to the decrease in the regulated voltage $E_R$ causes the current flowing through the tube 18 to decrease, thus increasing the voltage component $E_5$ which has the effect of increasing the potential on the control grid 53 of the tube 19 to recalibrate this tube for the new load condition requiring an increased value of $E_0$ in order to maintain the regulated voltage $E_R$ constant at the new generator load. It will be noted in tracing the circuit from the cathode 47 through the tube 18 and the condenser 65 to the control grid 53 that the voltage component $E_5$ is positive while the voltage component $E_6$ is negative so that the alphabetical sum $E_3$ is the arithmetic difference between these two quantities. Thus, an increase in the voltage component $E_5$ raises the potential of the control grid 53 and a decrease in the control potential $E_6$ raises the potential of the control grid 53.

An increase in the regulated voltage $E_R$ causes the reverse operation of the several component parts of the detector circuit to decrease the voltage $E_O$ and correspondingly the excitation current through the rectifier tubes 16 and 17. For example, upon an increase in the regulated voltage $E_R$, the unidirectional output voltages from the full wave rectifiers 66, 75 and 36 correspondingly increase, as does the voltage component $E_4$ for controlling the heating of the cathode 62 of the detector tube 18. The initial action of the increase in the voltage components $E_6$ lowers the potential of the control grid 53, since the potential $E_5$ across the detector tube 18 is substantially constant for a short period of time. The flow of current to the condenser 85 to increase the charge thereupon causes a current to flow through the stabilizing resistor 68 in a direction to lower the potential of the control grid 53 with respect to the terminal 77, thus reversing the conditions represented in Fig. 2 in that the stabilizing wave $E_7$ will be negative and the voltage component $E_1$ will decrease. Likewise, after the time necessary for the change in the voltage $E_4$ to become effective, the increase in the heating of the cathode 62 will cause more current to flow through the tube 18, thus decreasing the voltage drop thereacross and causing the voltage component $E_5$ to correspondingly decrease and thus recalibrate the tube 19 for the new required values of $E_5$ and $E_6$.

Many modifications may be made in the apparatus and circuits illustrated and described within the spirit of my invention. I do not wish to be limited otherwise than by the scope of the appended claims.

I claim as my invention:

1. In a regulating system, an alternating current power circuit, a dynamo-electric machine having a field winding for supplying energy to said power circuit, means for supplying a unidirectional current from said power circuit to said field winding comprising a grid controlled rectifier tube, means for controlling the output of said rectifier tube comprising a detector tube having an anode and a filament cathode sensitive to the regulated quantity, a grid controlled amplifier tube governed thereby, and additional means sensitive to variations in the regulated quantity for also influencing said amplifier tube.

2. In a regulating system, an alternating current power circuit, a dynamo-electric machine having a field winding for supplying energy to said power circuit, means for supplying a unidirectional current from said power circuit to said field winding comprising a grid controlled rectifier tube, means for controlling the current output of said rectifier tube comprising a grid governed control tube, means for controlling the control tube grid voltage comprising a filament cathode detector tube that is sensitive to variations in the regulated quantity, and means for introducing a voltage component into the grid circuit of said control tube that varies more promptly with variations in the regulated quantity than does the detector tube.

3. In a regulating system, an alternating current power circuit, a dynamo-electric machine connected to said power circuit and having a field winding, grid controlled rectifier means for supplying a unidirectional current to said field winding, means for controlling the current output of said rectifier means in response to a regulated quantity comprising a grid controlled tube, means for controlling the grid potential of said tube including a plurality of means for introducing control potential in series in the grid circuit of said tube that are sensitive to the regulated quantity and that are characterized by different rates of response to variations in the regulated quantity.

4. In a regulating system, an alternating current power circuit, a dynamo-electric machine connected to said power circuit and having a field winding, grid controlled rectifier means for supplying a unidirectional current to said field winding, means for controlling the current output of said rectifier means in response to a regulated quantity comprising a grid controlled tube, means for introducing a plurality of voltage components into the grid circuit of said tube, one of said components varying promptly with variations in the regulated quantity in a direction to effect a correction thereof, and another of said components varying more slowly with variations in the regulated quantity in a direction to effect a correction thereof.

5. In a regulating system, an alternating current power circuit, a dynamo-electric machine connected to said power circuit and having a field winding, grid controlled rectifier means for supplying a unidirectional current to said field winding, means for controlling the current output of said rectifier means in response to a regulated quantity comprising a grid controlled tube, means for introducing a plurality of voltage components into the grid circuit of said tube, one of said components varying promptly with variations in the regulated quantity in a direction to effect a correction thereof, another of said components varying more slowly with variations in the regulated quantity in a direction to effect a correction thereof, and another of said components effecting a temporary impulse in a direction to effect a correction in the regulated quantity.

6. In a regulating system, an alternating current power circuit, a dynamo-electric machine connected to said power circuit and having a field winding, grid controlled rectifier means for supplying a unidirectional current to said field winding, means for controlling the current output of said rectifier means in response to a variation in the regulated quantity comprising a grid controlled tube, means responsive to the regulated quantity for controlling the grid potential of said tube, and means sensitive to changes in the regulated quantity for introducing a surge potential of short duration into said grid control circuit in a direction to increase the rate of correction of the regulated quantity.

7. In a regulating system, an alternating current power circuit, a dynamo-electric machine connected to said power circuit and having a field winding, grid controlled rectifier means for supplying a unidirectional current to said field winding, means for controlling the current output of said rectifier means in response to a regulated quantity comprising a grid controlled tube, means for controlling the grid potential of said tube including full wave rectifying means responsive to the regulated quantity and a cathode filament diode detector tube also sensitive to the regulated quantity.

8. In a regulating system, an alternating current power circuit, a dynamo-electric machine connected to said power circuit and having a field winding, grid controlled rectifier means for supplying a unidirectional current to said field winding, means comprising a grid controlled tube and a cathode filament diode detector tube sensitive to the regulated quantity for controlling the current output of said rectifier means, means for controlling the grid potential of said tube including a plurality of means for introducing control voltage components in series in the grid circuit of the tube, one of said means introducing a voltage component that is promptly responsive to variations in the regulated quantity, and another of said means introducing a voltage component that is controlled by said detector tube.

9. In a regulating system, an alternating current power circuit, a dynamo-electric machine connected to said power circuit and having a field winding, grid controlled rectifier means for supplying a unidirectional current to said field winding, means for controlling the current output of said rectifier means in response to a regulated quantity comprising a grid controlled tube, and a cathode filament diode detector tube sensitive to the regulated quantity, means for controlling the grid potential of said tube including a plurality of means for introducing control voltage components in series in the grid circuit of the tube, one of said means introducing a voltage component that is promptly responsive to variations in the regulated quantity, another of said means introducing a voltage component that is controlled by said detector tube, and another of said means introducing a voltage component of short duration that varies in direction and degree with the change in the regulated quantity and in a direction to increase the rate of response in the correction of the regulated quantity.

10. In a regulating system, an alternating current power circuit, a dynamo-electric machine connected to said power circuit and having a field winding, grid controlled rectifier means for supplying a unidirectional current to said field winding, means for controlling the current output of said rectifier for controlling the excitation of said dynamo-electric machine comprising a cathode filament diode detector tube that is responsive to the voltage of said alternating current power circuit and a grid controlled amplifier tube, a plurality of means for introducing voltage components in series in the grid circuit of the amplifier tube comprising means for introducing a voltage component that is responsive promptly to variations in the regulated quantity, means sensitive to changes in the regulated quantity for introducing a surge potential of short duration in a direction to increase the rate of correction of the regulated quantity, and means including a cathode filament diode detector tube responsive to the regulated quantity for gradually recalibrating the amplifier tube after the initial correction in the regulated quantity.

11. In a regulating system an alternating current power circuit, a dynamo-electric machine connected to said power circuit and having a field winding, grid controlled rectifier means for supplying unidirectional current to said field winding, means for controlling the current output of said rectifier means comprising a cathode filament diode detector tube that is responsive to the voltage of said alternating current power circuit and a grid controlled amplifier tube controlled thereby, means for governing the amplifier tube in response to a change in the regulated quantity prior to the inherent time interval required for response of said diode tube, comprising means for introducing a voltage component into the grid circuit of said amplifier tube that is promptly responsive to variations in the alternating current power circuit voltage and means for introducing a surge voltage of short duration into the grid controlled circuit upon a variation in the power circuit voltage in a direction to increase the rate of correction of the regulated quantity.

12. In a regulating system, an alternating current power circuit, a dynamo-electric machine connected to said power circuit and having a field winding, grid controlled rectifier means for supplying unidirectional current to said field winding, means for controlling the current output of said rectifier means comprising a grid controlled tube, a plurality of means in the grid control circuit of said tube including a filament cathode diode detector tube responsive to the voltage of said alternating current circuit and a pair of full wave rectifier means for developing unipotential voltages that are a measure of the voltage of said alternating current power circuit, means for introducing one of said rectified voltages into the grid circuit of said tube in a direction to cause a corrective action in the regulated voltage prior to the time required for the response of the diode tube, and means governed by the second full wave rectifier for introducing a voltage surge of short duration into the grid controlled circuit of said tube in a direction to increase the rate of correction of the power circuit voltage.

13. In a regulating system, an alternating current power circuit, a dynamo-electric machine connected to said power circuit and having a field winding, grid controlled rectifier means for supplying a unidirectional current to said field winding, means for controlling the current output of said rectifier means comprising a grid controlled tube, means for introducing a control voltage component into the grid circuit of said tube that varies promptly in accordance with variations in the regulated quantity to initiate a corrective action, and a cathode filament diode detector tube sensitive to the regulated quantity for recalibrating the grid controlled tube after its initial response to variations in the regulated quantity to insure an accurate final adjustment.

FINN H. GULLIKSEN.